ated April 20, 1909.

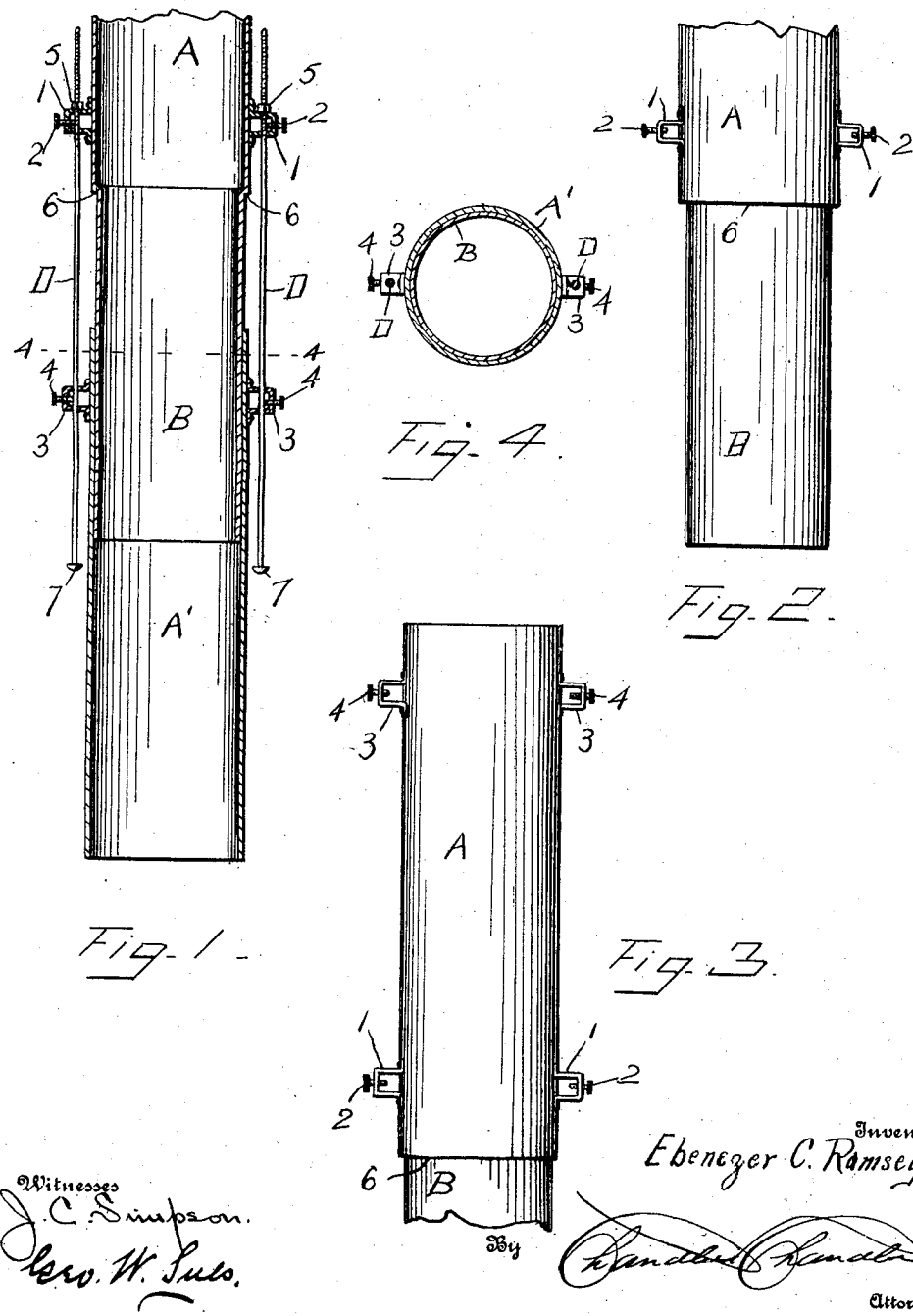

UNITED STATES PATENT OFFICE.

EBENEZER C. RAMSEY, OF WARRENSBURG, MISSOURI, ASSIGNOR OF ONE-FOURTH TO NESBITT H. ROBINSON, OF LANGDON, MISSOURI.

STOVEPIPE-COUPLING.

No. 919,213.  Specification of Letters Patent.  Patented April 20, 1909.

Application filed February 14, 1908. Serial No. 415,955.

*To all whom it may concern:*

Be it known that I, EBENEZER C. RAMSEY, a citizen of the United States, residing at Warrensburg, in the county of Johnson, State of Missouri, have invented certain new and useful Improvements in Stovepipe-Couplings; and I do hereby declare the following to be a full, clear, and exact description of the invention, such as will enable others skilled in the art to which it appertains to make and use the same.

This invention relates to certain new and useful improvements in stove pipe couplings.

The object of my invention is to provide a stove pipe coupling so constructed that the pipe sections may be adjustably secured, the coupling performing the further function of acting as a stay when long pipe sections are used in a horizontal position, as will be described more fully hereinafter.

In the accompanying drawings, I have shown in Figure 1 a portion of a pipe section to which my improvement is applied, the pipe sections being shown in section longitudinally. Fig. 2 shows the upper or offset end of the stove pipe. Fig. 3 shows the lower end of a pipe embodying my invention, and Fig. 4 a transverse sectional view of two connected pipes on the line 4—4 of Fig. 1.

The improved device relates to that class of stove pipes which are formed without crimps at the ends to reduce their diameter and to enable them to be more readily united telescopically and the stove pipe sections are therefore arranged to be telescopically united without crimping the ends.

The principal object of the present invention is to provide a stove pipe so constructed that the connected pipe sections may be lengthened or shortened.

In carrying out the invention one pipe section is formed with one portion A of the ordinary size of a stove pipe and another portion B reduced to engage within the other section A', as shown in Fig. 1, the general outer faces of the two pipes sections thus being uniform in diameter.

Attached to the larger portion A of one pipe section are brackets 1 having vertical apertures through which rods D—D pass and each bracket provided with a set screw 2 engaging the rod and thus locking it within the bracket, the object to be hereafter explained. The rods D are threaded at their upper ends and provided with nuts 5—5 bearing upon the brackets, so that the rods may be forcibly moved longitudinally through the brackets. The other pipe section A' is likewise provided with brackets 3—3 similar to the brackets 1—1 and through which the rods D—D pass and locked in position within the brackets by set screws 4—4, the terminals of the rods being enlarged as shown at 7—7. By this simple arrangement it is obvious that the pipe section A' may be adjusted upon the reduced portion B of the other pipe section to any required extent within the range of the rod and locked in the adjusted position. It will also be obvious that the rods may be forcibly moved longitudinally by operating the nuts 5—5 and thus move the pipe section A' forcibly upon the pipe section A—B. Thus in event of the pipe section A' becoming cramped upon the reduced portion B, force may be applied to overcome the cramping effect and forcibly adjust the pipe section A'. As is well known much difficulty is experienced in connecting stove pipes by one section becoming jammed or rusted upon the other section, but with a device arranged as herein shown any tendency of this kind can be readily overcome by simply applying a wrench or other suitable implement to the nuts 5—5.

The rods D—D are of sufficient length to enable the pipe section A' to be adjusted to any required extent upon the section A—B and firmly locked in its adjusted position. The rods also form efficient stays to the pipe sections to prevent sagging when applied to pipes arranged in horizontal position.

The pipe sections are thus effectually supported and all accidental displacement obviated.

Referring to Fig. 1, it will be noticed that I use two sets of ears 1 and 3 and two such coupling rods at each union of the two pipe ends.

This device is simple of construction and positive of operation, and,

Having thus described my said invention, what I claim is—

1. Two pipe sections telescopically engaged, a bracket extending laterally from each of said pipe sections, a rod extending through said brackets and threaded at one end, an adjusting nut engaging said threaded portion and bearing upon one of said brackets, and set screws operating through said brackets and against said rod whereby the pipe sections may be forcibly adjusted longitudinally.

2. In a device of the class described, a pipe section having a portion reduced in diameter, brackets connected to the larger portion of said pipe section, a pipe section of uniform diameter throughout and telescopically engaging the said reduced portion, brackets connected to said uniform pipe section, rods extending through said brackets and threaded at one end, nuts engaging said threaded ends and bearing upon the adjacent bracket, and means carried by said brackets for clamping said rods thereto whereby the pipe sections may be forcibly adjusted longitudinally.

In testimony whereof, I affix my signature, in presence of two witnesses.

EBENEZER C. RAMSEY.

Witnesses:
T. HYATT,
SAMUEL I. MAJOR.